(12) United States Patent
Schwab

(10) Patent No.: US 7,004,346 B2
(45) Date of Patent: Feb. 28, 2006

(54) METHOD AND INSTALLATION FOR MAKING AND FILLING CONTAINERS HAVING MEMBRANE SEAL PROVIDED WITH A PULL TAB

(75) Inventor: Dominique Schwab, Versailles (FR)

(73) Assignee: Erca Formseal, Les Ulis (FR)

( * ) Notice: Subject to any disclaimer, the term of this patent is extended or adjusted under 35 U.S.C. 154(b) by 81 days.

(21) Appl. No.: 10/479,538

(22) PCT Filed: Jun. 7, 2002

(86) PCT No.: PCT/FR02/01954

§ 371 (c)(1),
(2), (4) Date: Dec. 3, 2003

(87) PCT Pub. No.: WO02/100721

PCT Pub. Date: Dec. 19, 2002

(65) Prior Publication Data

US 2004/0144678 A1 Jul. 29, 2004

(30) Foreign Application Priority Data

Jun. 8, 2001 (FR) .................................. 01 07501

(51) Int. Cl.
*B65D 17/34* (2006.01)

(52) U.S. Cl. .................... 220/359.2; 53/453

(58) Field of Classification Search ............ 220/359.2, 220/805, 257.2, 258.2, 259.3–259.5; 493/75–77; 53/282, 307, 329.5, 559, 433, 453; 215/311, 215/349, 300, 351
See application file for complete search history.

(56) References Cited

U.S. PATENT DOCUMENTS

| 3,069,273 | A | | 12/1962 | Wayne | ............... 99/171 |
| 3,492,773 | A | * | 2/1970 | Bergstrom | ............... 53/433 |
| 4,018,028 | A | * | 4/1977 | Donnet | ............... 53/51 |
| 4,229,927 | A | * | 10/1980 | Day | ............... 53/433 |
| 5,025,611 | A | * | 6/1991 | Garwood | ............... 53/509 |
| 5,213,227 | A | * | 5/1993 | Koyama et al. | ............... 220/359.3 |
| 5,992,658 | A | * | 11/1999 | Berger | ............... 215/232 |
| 6,196,450 | B1 | * | 3/2001 | Varadarajan et al. | ............... 229/123.2 |

FOREIGN PATENT DOCUMENTS

| DE | 3722214 | * | 1/1989 | ............... 53/433 |
| DE | 195 24 427 A1 | | 7/1995 | |
| EP | 0 403 393 | | 6/1990 | |

(Continued)

Primary Examiner—Lien M. Ngo
(74) Attorney, Agent, or Firm—Sutherland Asbill & Brennan LLP

(57) ABSTRACT

Receptacles are thermoformed in a strip of thermoplastic material, filled with a substance, and covered by capsules formed in a capsule strip. Prior to applying the capsule strip onto the thermoplastic strip, a preliminary cut is made for each receptacle in a station through the thermoplastic strip, thereby defining a portion of the outline of the edge of the receptacle. While the receptacles and their capsules are being cut out from the strips, a through cut is made for each receptacle in a station, the through cut passing through the thermoplastic strip and the capsule strip over a portion of the remainder of the outline of the receptacle, and a complementary cut is formed which passes through the capsule strip alone, which is connected to the through cut, and which, for each receptacle, defines a portion of the capsule strip that forms a pull tab.

18 Claims, 2 Drawing Sheets

FOREIGN PATENT DOCUMENTS

| | | | | |
|---|---|---|---|---|
| FR | 1488333 | | 5/1966 | |
| FR | 2642726 | * | 2/1989 | .................. 220/359 |
| GB | 2068327 | * | 8/1981 | .................. 53/433 |
| JP | 54-120092 | * | 9/1979 | .................. 53/433 |
| JP | 2-19285 | * | 1/1990 | .............. 220/359.3 |
| JP | 3-212381 | * | 9/1991 | .................. 53/433 |

* cited by examiner

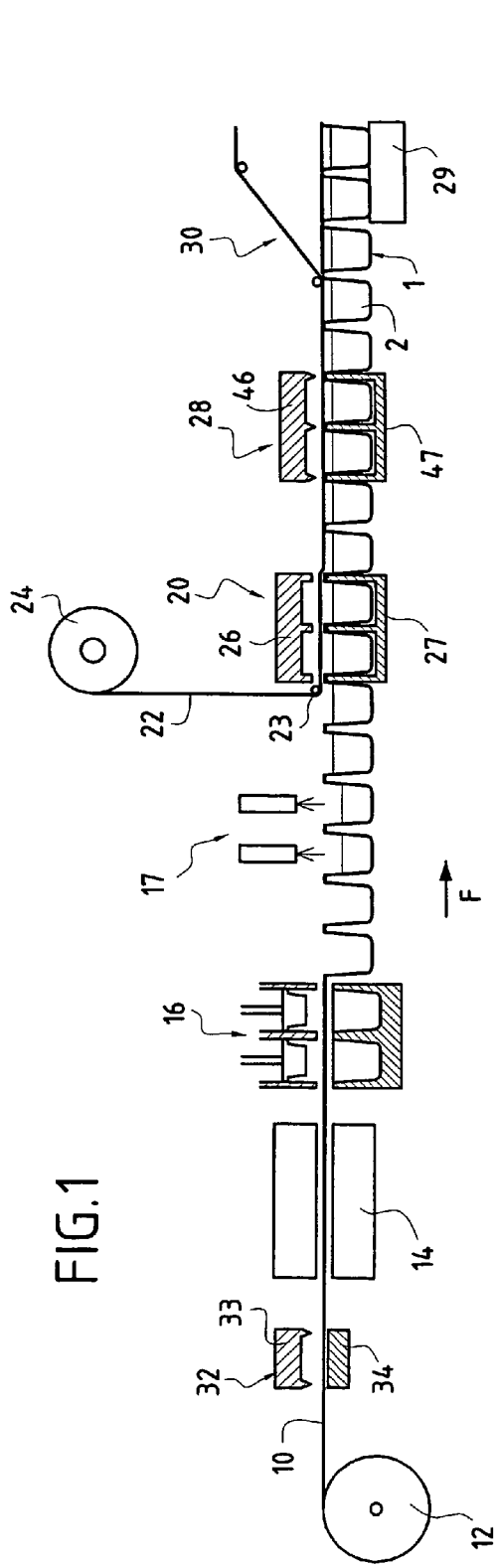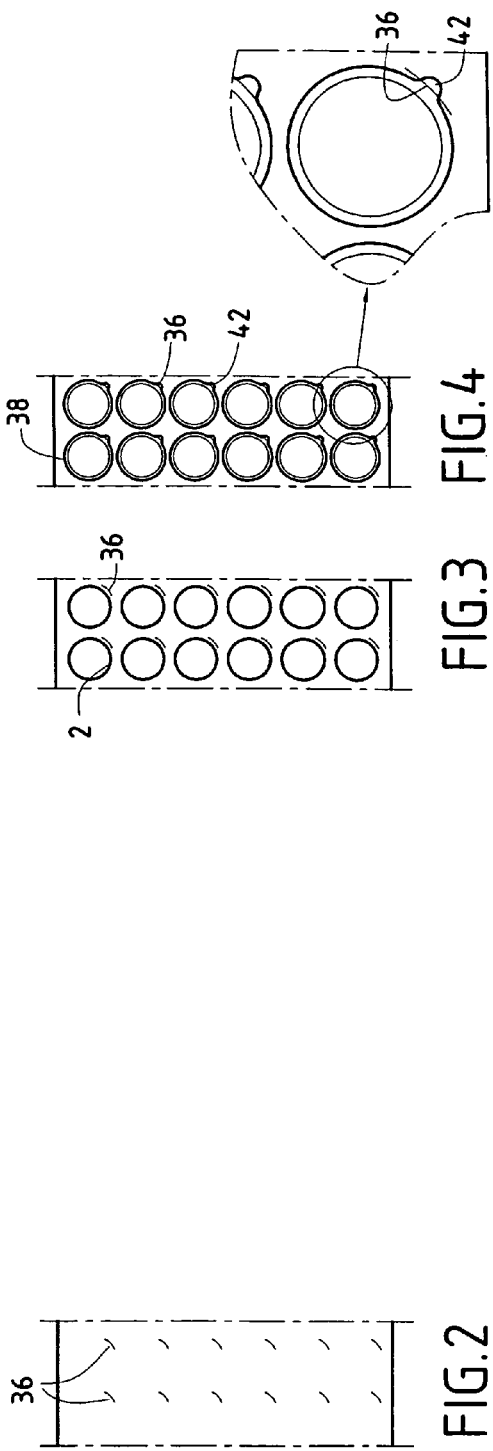

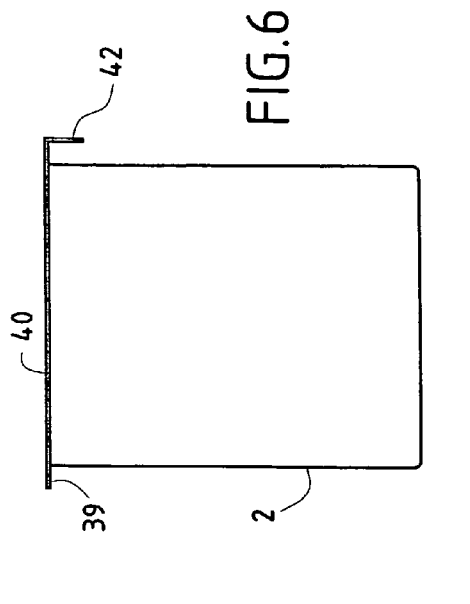
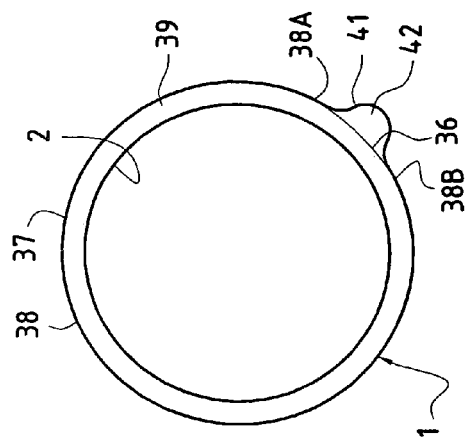
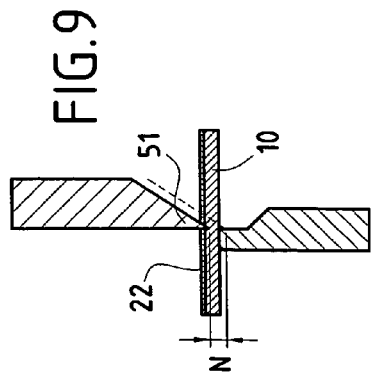
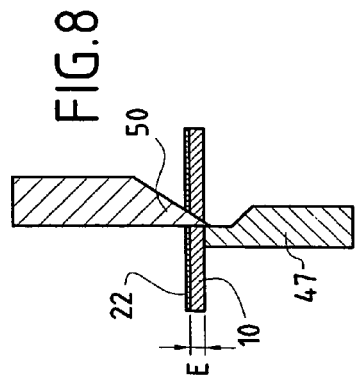
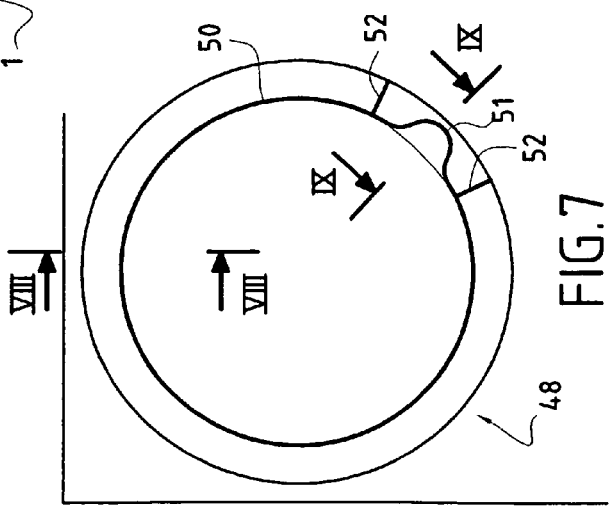

METHOD AND INSTALLATION FOR MAKING AND FILLING CONTAINERS HAVING MEMBRANE SEAL PROVIDED WITH A PULL TAB

The present invention relates to a method of fabricating and filling receptacles, the method comprising the steps of making receptacles by thermoforming a strip of thermoplastic material, filling the receptacles, applying a capsule strip on the strip of thermoplastic material, fixing the capsule strip to the edge of each receptacle so as to form one capsule per receptacle, cutting out the receptacles and their capsules from the strip of thermoplastic material and the capsule strip, and separating the receptacles with their capsules from said strips.

The invention also relates to an installation for fabricating and filling receptacles, the installation comprising a station for thermoforming receptacles in a strip of thermoplastic material, a station for filling the receptacles, means for applying a capsule strip to the strip of thermoplastic material and for fixing the capsule strip to the edge of each receptacle in such a manner as to form one capsule per receptacle, means for cutting out the receptacles and their capsules from the strip of thermoplastic material and the capsule strip, and means for separating the receptacles with their capsules from said strips.

BACKGROUND OF THE INVENTION

It is known to press the capsule strip against the strip of thermoplastic material, to seal the strips together, e.g. by hot-melt adhesive, around the rim of each receptacle, prior to performing a cutting-out operation in which the two strips are cut through simultaneously, and to separate the receptacles from the cutout strips which then constitute a grid of waste material.

When the receptacles are to be presented in groups of at least two receptacles interconnected by a bridge, care is taken to perform the cutting operation in such a manner as to preserve the bridge, in which case only the capsule strip is cut through in register with the bridge.

Regardless of whether receptacles are presented individually or in groups, the capsule of each receptacle extends over the top edge of the receptacle without projecting beyond said top edge, i.e. the outlines defining the edge and the capsule coincide.

In order to open such a receptacle and consume the product contained therein (e.g. a food product such as a yogurt, a fruit compost, or a beverage), it is necessary to detach the capsule from each receptacle.

Arrangements are generally made to provide sealing between the receptacle and the capsule in a region of the edges thereof that is set back somewhat from the outline so as to provide a pull tab. Insofar as the outline of the receptacle and that of the capsule coincide, it is necessary to be able to lift the tab off the edge of the receptacle, e.g. by inserting a fingernail between the tab and the edge, before it is possible to take hold of the tab in order to pull it and detach the capsule from the receptacle.

This operation is awkward and requires skill that some people do not possess, for example children or old people.

Furthermore, the size of the tab is limited by the shape of the edge of the receptacle and it does not always provide the user with a large enough area for grasping in order to make it easy to detach the capsule from the receptacle.

Receptacles exist in which the capsule presents a projecting tab which is folded down against the wall of the receptacle. That tab is easily lifted and generally offers a gripping area that is large enough for it to be easily detached from the receptacle.

That type of capsule is in the form of a relatively rigid cover, e.g. made of aluminum foil, which is cut out prior to being put into place on the receptacle and which is crimped onto a bead presented by said edge.

Such receptacles having a bead and a rigid capsule lead to high cost price, since the receptacles cannot be made by thermoforming at high rates of throughput and the capsules must be put into place and crimped individually.

SUMMARY OF THE INVENTION

An object of the present invention is to propose a thermoforming method and an installation that are free from the above-mentioned drawbacks.

According to the invention, this object is achieved by a method in which, prior to applying the capsule strip to the strip of thermoplastic material, a preliminary cut is made in the strip of thermoplastic material for each receptacle so as to define a portion of the outline of the edge of the receptacle, and in which during the step of cutting out the receptacles and their capsules, a through cut is made for each receptacle through the assembly constituted by the strip of thermoplastic material and by the capsule strip over a portion of the remainder of the outline of the receptacle, and a complementary cut passing through the capsule strip alone is also made, which complementary cut is connected to said through cut and thus defines for each receptacle a portion of the capsule strip that extends beyond the preliminary cut so as to form a pull tab for the capsule of the receptacle.

The object of the invention is achieved with an installation of the invention in which the installation further comprises a preliminary cutting station disposed upstream in the direction of advance of the strip of thermoplastic material relative to the means for applying said capsule strip onto said strip of thermoplastic material, said station including a preliminary cutting tool suitable, for each receptacle, for making a preliminary cut through the strip of thermoplastic material defining a portion of the outline of the edge of the receptacle, and, disposed downstream from the means for applying the capsule strip to the strip of thermoplastic material, both means for making a through cut for each receptacle through the assembly constituted by the strip of thermoplastic material and by the capsule strip over a portion of the remainder of the outline of the receptacle, and means for making a complementary cut for each receptacle, the complementary cut passing through the capsule strip alone, the complementary cut being connected to said through cut and defining, for each receptacle, a portion of the capsule strip extending beyond the preliminary cut so as to form a pull tab for the capsule of the receptacle.

With the invention, for each receptacle, the outline of the receptacle (or more precisely the outline of the rim of the receptacle that remains substantially in the plane of the thermoplastic strip on the inside of the preliminary cut) and that of the capsule are different insofar as the capsule presents a tab which projects from the edge of the receptacle. This tab is made by an astute combination of the preliminary cut made prior to the capsule strip was put into place and the through and complementary cuts made after it has been put into place. The invention does not penalize rates of production, and in particular it enables capsules to be made by being cut from a capsule strip after the strip has been placed on the thermoplastic strip and the capsules have been secured by the method conventionally used for manufacture at high rates, e.g. by hot-melt adhesive or by heat sealing.

The fact that the complementary cut passes through the capsule strip alone, means that the strip of thermoplastic material in the region of the capsule strip lying between the preliminary cut and the complementary cut is not separated. As a result, this region still forms part of the grid of waste material of the thermoplastic strip and is taken away together with the remainder of the grid when the receptacles are separated therefrom.

Advantageously, the preliminary cut is formed by an incision. To do this, the preliminary cutting tool presents a preliminary cutting edge which defines an open-ended line instead of a closed outline.

In which case, the preliminary cut does not lead to any waste, so that no means need to be provided for removing waste from this cut, and even when it presents the preliminary cuts, the thermoplastic strip is still entirely capable of being handled as though it were a solid thermoplastic strip.

Advantageously, the through cut and the complementary cut are made simultaneously, without any special step being necessary for each of these cutting operations.

Thus, advantageously, the installation includes a final cutting station having a cutting tool and a backing tool disposed respectively above and below the assembly constituted by the strip of thermoplastic material and by the capsule strip, the cutting tool presenting a through cutting edge suitable for co-operating with said backing tool to form the through cut and a complementary cutting edge which is set back upwards from the edge of the through cutting edge.

The tool including the complementary cutting edge and the through cutting edge is thus actuated as a whole, in the same manner as a conventional cutting tool.

In which case, and advantageously, the assembly constituted by the through cutting edge and by the complementary cutting edge forms a continuous edge defining a closed outline. These two edges can be made as a single piece and can be distinguished from each other by being at different levels, with the changeover from one level to the other either being gradual or via a step.

The invention also provides a receptacle comprising a body made by thermoforming a thermoplastic material and containing a product, the receptacle being closed by a capsule applied to the edge thereof and fastened thereto.

As mentioned above, receptacles already exist that are made by thermoforming and that are provided with a capsule cut out from a strip of capsules after being placed on the edge of the receptacle. Receptacles of this type can be manufactured at no cost and at high rates of throughput, but their capsules are difficult to detach.

There also exist receptacles in which the capsules are easier to detach since they present tabs that extend beyond the edges of the receptacles. Such a receptacle presents a bead onto which the capsule is crimped, which capsule must therefore be sufficiently rigid. Those receptacles cannot be fabricated by thermoforming in a strip of thermoplastic material, and each capsule must be placed and fastened separately on the body of the receptacle. As a result, rates of throughput are low and production cost is high.

The invention seeks to provide a receptacle that avoids those drawbacks.

This object is achieved by the fact that the outline of the edge of the receptacle and the outline of the capsule both present respective first portions where said outlines coincide, and respective second portions where the capsule projects beyond the edge of the receptacle to form a pull tab for the capsule which presents the same thickness as the capsule.

Thus, the receptacle can be formed from a strip of thermoplastic material and the capsule can be placed and fastened on its edge using a capsule strip. The first portion of the outline of the receptacle edge and the first portion of the outline of the capsule can be constituted by a single cut passing through both strips, whereas the second portion of the outline of the receptacle edge can be made by a preliminary cut made through the strip of thermoplastic material prior to the capsule strip being placed thereon, and the second portion of the outline of the capsule can be made by cutting through the capsule strip alone, after the capsule strip has been put into place.

The invention will be well understood and its advantages will appear better on reading the following detailed description of an embodiment given by way of non-limiting example.

BRIEF DESCRIPTION OF THE DRAWINGS

The description refers to the accompanying drawings, in which:

FIG. 1 is a diagrammatic view of an installation in accordance with the invention;

FIGS. 2, 3, and 4 are fragmentary plan views of the thermoplastic strip showing three successive steps in the method in accordance with the invention;

FIG. 5 is a plan view of a receptacle in accordance with the invention;

FIG. 6 is a side view of the FIG. 5 receptacle;

FIG. 7 shows a tool used for performing simultaneously the through cut and the complementary cut; and FIGS. 8 and 9 are section views respectively on lines VIII—VIII and IX—IX of FIG. 7.

DETAILED DESCRIPTION OF THE INVENTION

The installation of FIG. 1 serves to thermoform receptacles from a thermoplastic strip 10, to fill the receptacles with a substance such as a liquid, a paste, or a jelly (in particular a food product), and to close the filled receptacles.

The installation comprises a reel 12 from which the thermoplastic strip 10 is unrolled, the strip passing, generally horizontally, through the entire installation and being driven step by step by support and drive means (not shown).

In the description below, the upstream to downstream direction as indicated by arrow F should be understood as designating the direction in which the strip advances through the various successive stations of the installation.

Thus, in the direction of arrow F, the installation comprises in succession: a heater box 14 which serves to raise the thermoplastic strip to its thermoforming temperature; a thermoforming station 16 in which the receptacles are thermoformed and possibly also labeled; a measuring-out station 17 where the receptacles are filled; and a station 20 for closing the receptacles in which a capsule strip 22 is unwound from a reel 24 and placed on the open top end of the receptacles against the top face of the thermoplastic strip 10 and is sealed to the rims of the receptacles using a sealing tool 26. Downstream from the station 20, the installation has a cutting station 28 in which the receptacles are cut by groups or individually from the strip, and then a station 30 in which the grid of waste constituted by the portions of the strips 10 and 22 from which the receptacles have been cut out is separated from the receptacles, and in which the receptacles are packaged and palletized.

In the station 20, or immediately before it, the capsule strip 22 is pressed against the thermoplastic strip by means comprising, for example, deflector wheels 23. The sealing tool 26 which is located above the strips 22 and 10, and similarly its backing tool 27 which is located beneath the receptacles, are vertically movable to clamp the edges of the receptacles between them in such a manner as to seal the capsule strip onto the thermoplastic strip, e.g. by hot-melt adhesive.

The installation also has a preliminary cutting station 32 which is disposed upstream from the receptacle closure station 20. In the example shown, this station 22 is even disposed upstream of the heater box 14.

In general, it is advantageous for the preliminary cutting station 32 to be disposed upstream from the thermoforming station 16. The station 32 includes a cutting tool 33 and a backing tool 34 which are disposed on opposite sides of the strip 10 and which are spaced apart form each other to allow the strip to advance, and then move towards each other n order to cut the strip. By placing the station 32 ahead of the thermoforming station, it is possible to simplify the structure of the tool and its backing tool and to ensure that when that one of the tool and the backing tool which his situated beneath the strip is moved downwards through a relatively small amplitude, that small-amplitude displacement suffices to enable the strip to advance, since in this location, the strip still does not present downwardly projecting portions constituted by the bodies of the theremoformed receptacles.

Nevertheless, it may be preferred for the preliminary cutting station to be disposed downstream from the thermoforming station, the essential point being that it is upstream from the location where the strip 22 joins the strip 10.

Advantageously, cutting is performed hot, i.e. in the station 32, at least the cutting blades are heated. As a result, the blades are sterile and the installation can be of the "ultraclean" type.

In the example shown, the preliminary cutting tool 33 is disposed above the strip 10 and its backing tool 34 is disposed beneath the strip. The example shown applies to the situation in which two rows of receptacles are made each time the strip advances through one step. Thus, the thermoforming station has two rows of thermoforming chambers and thermoforming pistons.

Similarly, the preliminary cutting tool has two rows of cutter blades, one per receptacle made on each advance step.

FIG. 2 shows the appearance of the strip on leaving the preliminary cutting station 32. It can be seen that for each receptacle the preliminary cutting tool has made a preliminary cut 36 through the strip 10. These cuts 36 are in the form of simple incisions passing through the strip 10. As a result, no waste is generated from the strip by the preliminary cutting.

FIG. 3 shows the appearance of the strip on leaving the thermoforming station 16. It can be seen that two rows of receptacle bodies 2 have been thermoformed in the strip. A preliminary cut 36 is to be found beside each of them.

FIG. 4 shows the appearance of the strip on leaving the cutting station 28. It can be seen that a cut 38 has been made around each receptacle. Since the strip of capsules 22 is placed over the top openings of the receptacles, the preliminary cuts 36 are drawn in fine lines in the enlarged portion of FIG. 4, since these cuts are masked by the capsule strip.

FIG. 5 is a plan view of a receptacle 1 after it has been detached from the grid of waste that remains of the strips 10 and 22.

The edge of the receptacle forms a transversely extending collar 34 which, during thermoforming, is disposed in the plane of the thermoplastic strip 10. The outline of this edge presents a first portion 37 constituted by the portion of the cut 38 which extends beside the body 2 of the receptacle from the preliminary cut 36 between the points 38A and 38B where the cut 38 and the preliminary cut 36 meet. The second portion of the outline of the edge of the receptacle is formed by the preliminary cut 36.

The capsule 40 is disposed on the edge of the receptacle 39 overlying the opening of the receptacle. The outline of the capsule presents a first portion where it coincides with the first portion 37 of the outline of the edge of the receptacle. It also presents a second portion 41 defined by the portion of the cut 38 which extends on the other side of the preliminary cut 36 away from the body of the receptacle. Thus, between the preliminary cut 36 and the second portion 41 of the outline of the capsule, the capsule forms a pull tab 42 which is formed only in the capsule strip and which constitutes a surface that can be gripped in order to pull the capsule 40 off the receptacle so as to open it. As can be seen in FIG. 6, the tab 42 is folded down against the wall of the receptacle body 2, or at least towards said wall.

In the portion 37, the outlines of the edge of the receptacle and of the capsule are common. They are constituted by a through cut performed in the station 28 through the assembly constituted by the strip of thermoplastic material 10 and the capsule strip 22 superposed thereon. Thus, the portion 37 of the cut 38 corresponds to a through cut. This through cut extends towards the preliminary cut 36, at least far enough to meet this cut. It may extend a very short way beyond the preliminary cut 36 towards the tab 42 in order to make it easier to separate the receptacle from the grid of waste material.

The outline 41 of the tab is shaped by a complementary cut which passes through the capsule strip 22 only and which runs into the through cut 37.

The portion of the thermoplastic strip 10 which underlies the tab 42 in the cutting station 28 is separated from the body of the receptacle by the preliminary cut 36 and forms part of the grid of waste material. In this case, when the receptacles are separated from the grid of waste material, this portion of the strip 10 is naturally separated from the receptacle, so that the tab 42 finally comprises only a single thickness, i.e. that which is constituted by the capsule strip. The capsule strip is sealed to the edge of the receptacle solely via the rim 39 of the receptacle along a line of sealing which, in the region of the preliminary cut 36, occupies only that side of the cut which is opposite from the side occupied by the tab 42.

This avoids generating any waste beneath the tab that is separate from the grid of waste material, while still enabling the tab to present only the thickness of a capsule so that said tab is flexible and is easily folded down against the receptacle, thereby enabling it to present dimensions that are relatively large without interfering with subsequent packaging of the receptacle.

The cutting station 28 of FIG. 1 is a final cutting station in which the through cut 37 and the complementary cut 41 are made simultaneously. In conventional manner, this cutting station comprises a cutting tool 46 and a backing tool 47 which are disposed on opposite sides of the strips 10 and 22. The backing tool 47 is disposed under the strip 10 and it is movable between a low position into which it is moved downwards through a distance which is slightly greater than the depth of the receptacles so as to allow the thermoplastic strips to advance, and a high position in which it co-operates with the bottom face of said strip between the receptacles.

The tool 47 is movable between an inactive position in which it is displaced a short distance upwards to allow the thermoplastic strip to advance, and an active, cutting position in which it is moved downwards so as to co-operate with the backing tool 47 and cut through the strips 10 and 22.

FIG. 7 is a fragmentary plan view of the cutting tool 46 and shows a cutting blade 48 for making the line of cut 38. This blade presents a through cutting edge 50 for forming the through cut 37 and a complementary cutting edge 51 which serves to form the complementary cut 41. FIGS. 8 and 9 are sections respectively through the edge 50 and the edge 51. For greater clarity, they show not only these edges, but also the backing tool 47 in the position occupied by the strip of thermoplastic material 10 and the capsule strip 22 in the final cutting station. It can be seen that the complementary cutting edge is set back upwards relative to the through cutting edge. The difference in level between these two edges is selected so that when the cutting tool is in its low position, the edge 50 passes through the thickness of the superposed strips 10 and 22 while the edge 51 passes through the thickness of the capsule strip 22 alone. The difference in level N between the two edges may be substantially equal to the thickness E of the strip 10, for example. Naturally, the edge 51 may nick the thickness of the strip 10 to a small extent, but must not pass through it.

The difference in level between the edges 50 and 51 may be obtained by steps 52 or it may be obtained progressively.

FIG. 7 shows that the assembly formed by the through cutting edge 50 and the complementary cutting edge 51 forms a continuous edge defining a closed outline.

In contrast, the preliminary cutting tool presents a preliminary cutting edge which defines an open-ended line. For example it occupies an arc of a cercle or a rectilinear segment. This preliminary cutting edge preferably presents a radius of curvature which is greater than the radius of curvature for the main portion of the through cutting edge 50. This ensures that the through cut made in the station 28 necessarily encounters the preliminary cut even if the strip should be slightly offset due to manufacturing tolerances. Furthermore, as can be seen in the enlarged view of FIG. 4, the preliminary cut 36 extends over a length that is greater than the portion of the outline of the receptacle edge that extends between the points 38A and 38B (compare FIGS. 4 and 5).

The preliminary cut line and the through cut line are advantageously implemented in such a manner that the second portion of the outline of the receptacle edge formed by the preliminary cut 36 meets the first portion 37 of said outline substantially tangentially as shown in FIG. 5. Looking at FIG. 5, it will also be understood that the second portion of the outline of the receptacle edge formed by the preliminary cut 36 presents a radius of curvature that is greater than the radius of curvature of the largest circle that can be inscribed in the outline of the edge of the receptacle.

In the method of the invention, the preliminary cut 36 is made either before the receptacles are thermoformed, or else after said thermoforming, but before the strip 22 is applied to the strip 10.

Advantageously, the method includes a step in which the pull tabs 42 are folded down towards the walls of the receptacles, and the installation includes means for this purpose. For example, provision can be made for the installation to have a system of fingers that are vertically displaceable over the palletizing table 29 between a low position in which they co-operate with the tabs of a group of receptacles in order to fold them downwards, and a high position in which they allow the receptacles to be removed from the table 29. Provision can also be made to separate the grid of waste material, not by raising it above the receptacles as shown in FIG. 1, but by moving it downwards, in which case this downward displacement can entrain the tabs downwards. For this purpose, provision can be made for the tabs to remain linked by a very weak point of attachment to the grid of waste material, this point rupturing when the grid of waste material is separated from the receptacles. The edge 51 may be shaped in such a manner as to present a very short gap for forming this attachment point.

A portion of the outline of each receptacle is formed, as mentioned above, by the preliminary cut 36. In a first variant, for receptacles that are to be presented individually, the through cut 37 is made over the entire remaining portion of the outline of each receptacle.

In a second variant, for receptacles that are to be presented in groups of at least two receptacles interconnected by at least one bridge, the through cut is made through all of the remaining portion of the outline of each receptacle with the exception of said bridge, and the complementary cut is formed over a line that includes said bridge. Under such circumstances, the complementary cut in each bridge can penetrate to some extent into the thickness of the thermoplastic strip 10 so as to create a zone of weakness enabling the receptacles to be separated from one another in order to consume the product they contain.

It should be apparent that the foregoing relates only to the preferred embodiments of the present invention and that numerous changes and modifications may be made herein without departing from the spirit and scope of the invention as defined by the following claims and the equivalents thereof.

What is claimed is:

1. A method of fabricating and filling receptacles, the method comprising the steps of making receptacles by thermoforming a strip of thermoplastic material, filling the receptacles, applying a capsule strip on the strip of thermoplastic material, fixing the capsule strip to the edge of each receptacle so as to form one capsule per receptacle, cutting out the receptacles and their capsules from the strip of thermoplastic material and the capsule strip, and separating the receptacles with their capsules from said strips, wherein, prior to applying the capsule strip to the strip of thermoplastic material, a preliminary cut is made in the strip of thermoplastic material for each receptacle so as to define a portion of the outline of the edge of the receptacle, and wherein, during the step of cutting out the receptacles and their capsules, a through cut is made for each receptacle through the assembly constituted by the strip of thermoplastic material and by the capsule strip over a portion of the remainder of the outline of the receptacle, and a complementary cut passing through the capsule strip alone is also made, which complementary cut is connected to said through cut and thus defines for each receptacle a portion of the capsule strip that extends beyond the preliminary cut so as to form a pull tab for the capsule of the receptacle.

2. A method according to claim 1, wherein the preliminary cut is formed by an incision.

3. A method according to claim 1, wherein the through cut and the complementary cut are made simultaneously.

4. A method according to claim 1, wherein the preliminary cut is formed by an incision and wherein the through cut and the complementary cut are made simultaneously.

5. A method according to claim 1, wherein the preliminary cut is made before thermoforming the receptacles.

6. A method according to claim 1, wherein the preliminary cut is made after thermoforming the receptacles.

7. A method according to claim 1, wherein the preliminary cut and the complementary cut are made in such a manner that said cuts meet substantially tangentially with the through cut.

8. A method according to claim 1, wherein the pull tabs are folded towards the walls of the receptacles.

9. A method according to claim 1, wherein for receptacles that are to be presented individually, the through cut is formed over the entire remaining outline of each receptacle.

10. A method according to claim 1, wherein for receptacles that are designed to be presented in groups of at least two receptacles interconnected by at least one bridge, the through cut is made over the entire remainder of the outline of each receptacle with the exception of said bridge, and the complementary cut is made along a line including said bridge.

11. An installation for fabricating and filling receptacles, the installation comprising a station for thermoforming receptacles in a strip of thermoplastic material, a station for filling the receptacles, means for applying a capsule strip to the strip of thermoplastic material and for fixing the capsule strip to the edge of each receptacle in such a manner as to form one capsule per receptacle, means for cutting out the receptacles and their capsules from the strip of thermoplastic material and the capsule strip, and means for separating the receptacles with their capsules from said strips, the installation further comprising a preliminary cutting station disposed upstream in the direction of advance of the strip of thermoplastic material relative to the means for applying said capsule strip onto said strip of thermoplastic material, said station including a preliminary cutting tool suitable, for each receptacle, for making a preliminary cut through the strip of thermoplastic material defining a portion of the outline of the edge of the receptacle, and the installation further comprising, disposed downstream from the means for applying the capsule strip to the strip of thermoplastic material, both means for making a through cut for each receptacle through the assembly constituted by the strip of thermoplastic material and by the capsule strip over a portion of the remainder of the outline of the receptacle, and means for making a complementary cut for each receptacle, the complementary cut passing through the capsule strip alone, the complementary cut being connected to said through cut and defining, for each receptacle, a portion of the capsule strip extending beyond the preliminary cut so as to form a pull tab for the capsule of the receptacle.

12. An installation according to claim 11, wherein including a final cutting station having a cutting tool and a backing tool disposed respectively above and below the assembly constituted by the strip of thermoplastic material and by the capsule strip, the cutting tool presenting a through cutting edge suitable for co-operating with said backing tool to form the through cut and a complementary cutting edge which is set back upwards from the edge of the through cutting edge.

13. An installation according to claim 12, wherein the assembly constituted by the through cutting edge and by the complementary cutting edge forms a continuous edge defining a closed outline.

14. An installation according to claim 11, wherein the preliminary cutting tool presents a preliminary cutting edge that defines an open-ended line.

15. An installation according to claim 12, wherein the assembly constituted by the through cutting edge and by the complementary cutting edge forms a continuous edge defining a closed outline and wherein the preliminary cutting tool presents a preliminary cutting edge that defines an open-ended line.

16. An installation according to claim 11, wherein the preliminary cutting station is disposed upstream from the thermoforming station in an advance direction of the strip of thermoplastic material.

17. An installation according to claim 11, wherein the preliminary cutting station is disposed downstream from the thermoforming station in an advance direction of the thermoplastic strip.

18. An installation according to claim 11, wherein including means for folding down the pull tab of the capsule of each receptacle against the wall of the receptacle.

* * * * *